Oct. 12, 1943.  E. E. HOLLANDER  2,331,781
FLEXIBLE COUPLING FOR SHAFTS
Filed Nov. 14, 1942
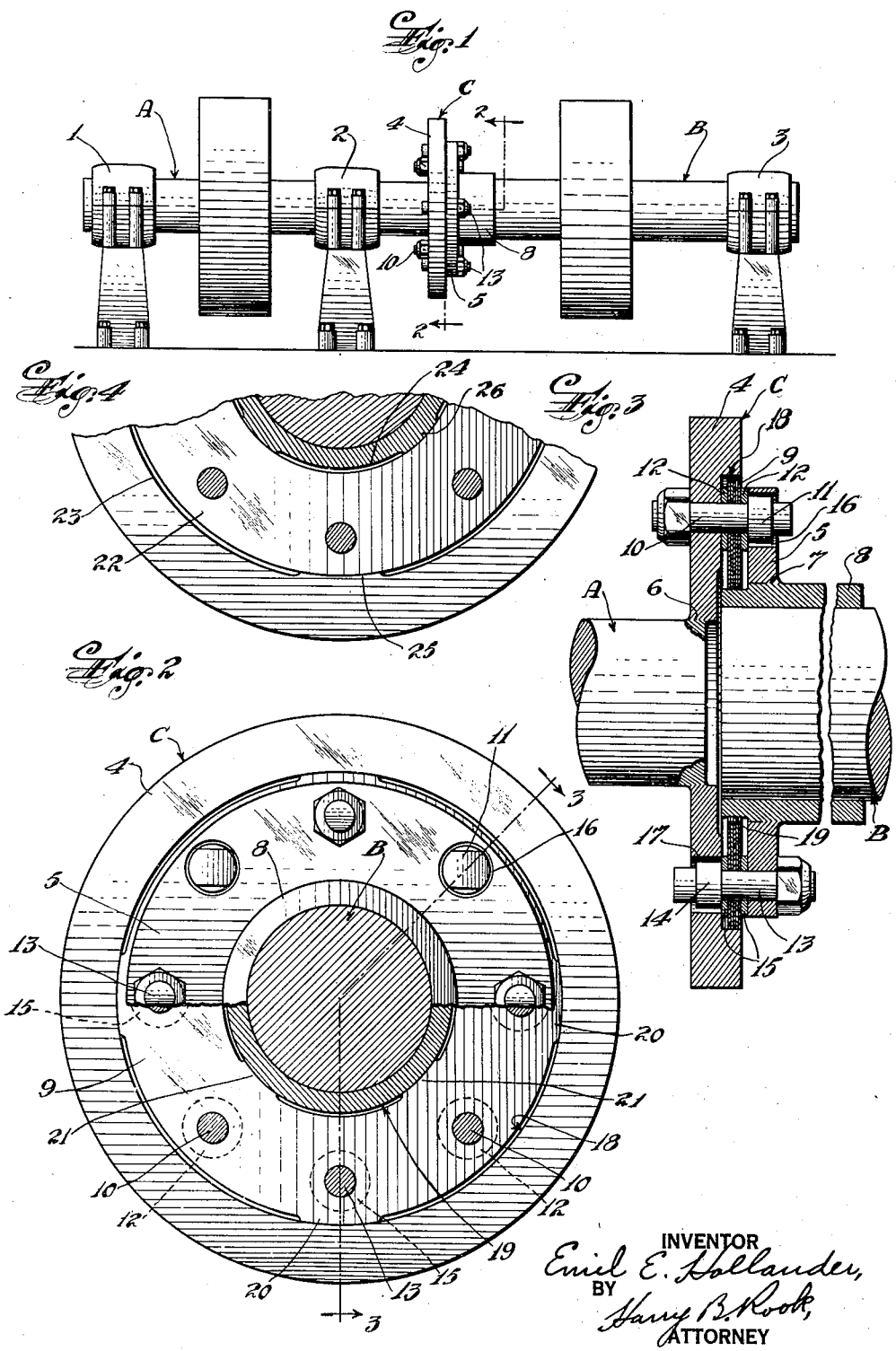
INVENTOR
Emil E. Hollander,
BY
Harry B. Rook,
ATTORNEY Patented Oct. 12, 1943

2,331,781

UNITED STATES PATENT OFFICE 2,331,781

FLEXIBLE COUPLING FOR SHAFTS

Emil E. Hollander, Kearny, N. J., assignor to Star Electric Motor Company, Bloomfield, N. J., a corporation of New Jersey Application November 14, 1942, Serial No. 465,535

8 Claims. (Cl. 64—13)

This invention relates in general to flexible couplings for shafts, for example a coupling for connecting together the shafts of a Diesel engine and an electrical generator in end to end relation to each other in such a manner as to compensate for a slight axial misalignment of the two shafts.

My invention particularly contemplates a situation wherein at least one of the shafts to be coupled is journaled in only one bearing that is in distant relation to the end of said shaft that is to be connected to the other shaft; and accordingly, one object of my invention is to provide a flexible coupling of the general character described by which the second-mentioned end of the first-mentioned shaft shall be supported upon the adjacent end of the other shaft in a novel and improved manner to compensate for the missing bearing for the first-mentioned shaft.

My invention is especially useful in a flexible coupling which comprises a coupling member or flange for each of the shafts to be coupled and a coupling ring that is rigid in radial directions and flexible in directions at angles to its plane and is rigidly connected to both of said coupling flanges at points spaced annularly of the ring with the points of connection of one flange and said ring arranged in alternate relation to the points of connection of the other flange and said ring; and another object of the invention is to provide such a coupling wherein the coupling flanges and said flexible ring shall be constructed and combined in a novel and improved manner such that the flexible ring shall directly contact at its outer periphery with one coupling flange and at its inner periphery with the other flange, and the ring shall be free to flex between said points of connection of the flanges and the ring with a minimum of frictional contact between said flanges and the ring.

A further object is to provide a coupling of this character which shall include novel and improved means for accurately centering said coupling flanges with respect to each other, i. e., locating and positively holding the centers of the coupled ends of the shafts exactly opposite each other or in collinear relation to prevent parallel misalignment of the shafts.

Other objects, advantages and results of the invention will be brought out by the following description in conjunction with the accompanying drawing in which Figure 1 is a schematic side elevational view showing one manner of using the flexible coupling embodying my invention.

Figure 2 is a transverse sectional and elevational view taken on the line 2—2 of Figure 1.

Figure 3 is a vertical longitudinal sectional view through the flexible coupling on the line 3—3 of Figure 2.

Figure 4 is a fragmentary view similar to Figure 2 showing a modification of the invention.

Specifically describing the illustrated embodiment of the invention, the reference characters A and B designate the two shafts which are coupled by a flexible coupling C. One of the shafts, specifically the shaft A has a two-point support comprising the bearings 1 and 2, while the other shaft has a one-point support, consisting of a bearing 3. This relationship and mounting of two shafts is commonly found in motor-generator sets, where for example the shaft A might comprise the drive shaft of a Diesel engine while the shaft B might be a part of the armature mounting of an electrical generator.

The flexible coupling C comprises two coupling flanges 4 and 5 each connected to one of the shafts A and B in any suitable manner so that the flanges are coaxial with the respective shafts. As shown, the flange 4 is welded at 6 directly to the shaft A, while the flange 5 is welded at 7 to a sleeve 8 which is keyed or otherwise secured upon the shaft B for rotation therewith. The two flanges are arranged in opposed spaced relation in approximately parallel planes which are perpendicular to the axes of the respective couplings.

Each flange preferably is coaxial with its corresponding shaft, and interposed between the two flanges is a coupling ring 9 which is coaxial with the flanges and connected to both thereof at points spaced annularly of the ring with the points of connection between said ring and one said flange being alternately disposed with respect to the points of connection of said ring with the other flange. As shown, the coupling ring is connected to the flange 4 by a plurality of bolts 10, the heads 11 of which clamp the ring 9 between them and the flange. Preferably spacing washers 12 are interposed between the flange and the ring and between the ring and the bolt heads. Similarly the flange 5 is connected to the ring 9 by a plurality of bolts 13 whose heads 14 clamp the ring between them and the flange. Washers 15 corresponding to the washers 12 space the coupling ring from the flange 5 and from the heads 14 of the bolts 13. The flange 5 has a plurality of openings 16 each to loosely receive the head 11 of one of the bolts 10, while the flange 4 has similar openings 17 each loosely receiving the head 10 of one of the bolts 13.

The coupling flange 4 has an annular surface 18, preferably cylindrical, facing inwardly toward the axis of the flange, and the other flange 5 has an annular surface 19, preferably cylindrical, which faces outwardly from the axis of said flange; and said surfaces 18 and 19 are coaxial with their respective flanges. The outer and inner peripheries of the coupling ring 9 contact with the respective surfaces 18 and 19 at annularly spaced zones with said zones of contact on the inner periphery of the coupling ring disposed in alternate relation to said zones of contact on the outer periphery of the coupling ring; and the other portions of said peripheries of the coupling ring located between said zones of contact are spaced from the respective surfaces 18 and 19. More particularly, the coupling ring has a plurality of radially disposed lugs 20 on its outer periphery and a plurality of radially disposed lugs 21 on its inner periphery which are arranged in alternate relation to the lugs 20; and these lugs form the zones of contact between the coupling ring and the flanges.

It is also desirable that each said zone of contact or lug be located in line radially of the coupling ring with one of the points of connection, i. e., one of the bolts 10 or 13, between said ring and said coupling flanges, as most clearly shown in Figure 2.

The coupling ring preferably comprises a plurality of metallic laminations, for example a plurality of resilient metallic thin flat rings secured together in superposed coaxial relation to each other as most clearly shown in Figure 3 so that the coupling ring is rigid in radial directions but may flex transversely of itself or out of its own plane.

With this construction, it will be seen that the inner and outer peripheries of the flexible coupling ring directly contact with the respective surfaces 19 and 18 on the flanges at the spaced zones formed by lugs 20 and 21, while the portions of the ring between said zones or lugs are spaced from the surfaces 18 and 19. Accordingly the coupling flanges are positively held with their centers collinear or exactly opposite each other and the coupling ring may flex to compensate for angular misalinement of the axes of rotation of said flanges or the axes of the shafts A and B. The spaced and small zones of frictional contact between the coupling ring and the surfaces 19 of the flanges facilitate said flexing of the coupling ring and substantially eliminate friction between said flanges and the coupling ring. Also, it will be evident that the coupling C will effectually support the end of the shaft B that has no bearing so that the coupling in effect will take the place of the missing bearing. The particular construction and combination of the coupling flanges and the coupling ring also will prevent parallel misalinement of the axes of the flanges or shafts.

A modification of the invention is shown in Figure 4 where the inner and outer peripheries of the coupling ring 22 are cylindrical and the surfaces 23 and 24 of the coupling flanges corresponding to the surfaces 18 and 19 respectively, are formed with the respective ribs or lugs 25 and 26 to contact with the outer and inner peripheries of the coupling ring in substantially the same manner in which the lugs 20 and 21 of the coupling ring 9 contact with the surfaces 18 and 19 of the form of the invention illustrated in Figures 2 and 3.

It will be evident to those skilled in the art that the construction of the coupling ring and the coupling members may be widely modified and changed, and that the coupling members may be secured to the shafts in other ways than those above described, within the ambit of the invention. Also, it will be evident that the coupling may be used for connecting any two shafts without departing from the spirit or scope of the appended claims.

What I claim is:

1. In a flexible coupling for shafts which comprises a coupling flange to be secured coaxially on each of two shafts to be coupled, one flange having an annular surface facing inwardly toward the flange axis and the other flange having a surface facing outwardly from the axis of the flange, a coupling ring which is rigid in radial directions and otherwise flexible and has its outer and inner peripheries in contact respectively with said inwardly facing surface and said outwardly facing surface, and means connecting said coupling flanges to said coupling ring at points spaced annularly of said ring and with the points of connection between said ring and one said flange alternately disposed with respect to the points of connection of said ring with the other flange, whereby said coupling flanges shall be positively held with their centers collinear and said coupling ring may flex to compensate for angular misalinement of the axes of rotation of said flanges; said inner and outer peripheries of said coupling ring contacting with the respective said surfaces on said coupling flanges at annularly spaced zones, with the zones of contact on the inner periphery of the coupling ring disposed in alternate relation to said zones of contact on the outer periphery of said coupling ring and the other portions of said peripheries of said coupling ring being spaced from the respective said surfaces.

2. In a flexible coupling for shafts which comprises a coupling flange to be secured coaxially on each of two shafts to be coupled, one flange having an annular surface facing inwardly toward the flange axis and the other flange having a surface facing outwardly from the axis of the flange, a coupling ring which is rigid in radial directions and otherwise flexible and has its outer and inner peripheries in contact respectively with said inwardly facing surface and said outwardly facing surface, and means connecting said coupling flanges to said coupling ring at points spaced annularly of said ring and with the points of connection between said ring and one said flange alternately disposed with respect to the points of connection of said ring with the other flange, whereby said coupling flanges shall be positively held with their centers collinear and said coupling ring may flex to compensate for angular misalinement of the axes of rotation of said flanges; said inner and outer peripheries of said coupling ring contacting with the respective said surfaces on said coupling flanges at annularly spaced zones, with the zones of contact on the inner periphery of the coupling ring disposed in alternate relation to said zones of contact on the outer periphery of said coupling ring and the other portions of said peripheries of said coupling ring being spaced from the respective said surfaces, each said zone being located in line radially of said ring with one of said points of connection between said coupling ring and said coupling flanges.

3. In a flexible coupling for shafts which comprises a coupling flange to be secured coaxially on each of two shafts to be coupled, one flange having an annular surface facing inwardly toward the flange axis and the other flange having a surface facing outwardly from the axis of the flange, a coupling ring which is rigid in radial directions and otherwise flexible and has its outer and inner peripheries in contact respectively with said inwardly facing surface and said outwardly facing surface, and means connecting said coupling flanges to said coupling ring at points spaced annularly of said ring and with the points of connection between said ring and one said flange alternately disposed with respect to the points of connection of said ring with the other flange, whereby said coupling flanges shall be positively held with their centers collinear and said coupling ring may flex to compensate for angular misalinement of the axes of rotation of said flanges; said surfaces on said coupling flanges being cylindrical, and said coupling ring having radially disposed lugs on its outer and inner peripheries to contact with the respective said surfaces on said coupling flanges at annularly spaced zones.

4. In a flexible coupling for shafts which comprises a coupling flange to be secured coaxially on each of two shafts to be coupled, one flange having an annular surface facing inwardly toward the flange axis and the other flange having a surface facing outwardly from the axis of the flange, a coupling ring which is rigid in radial directions and otherwise flexible and has its outer and inner peripheries in contact respectively with said inwardly facing surface and said outwardly facing surface, and means connecting said coupling flanges to said coupling ring at points spaced annularly of said ring and with the points of connection between said ring and one said flange alternately disposed with respect to the points of connection of said ring with the other flange, whereby said coupling flanges shall be positively held with their centers collinear and said coupling ring may flex to compensate for angular misalinement of the axes of rotation of said flanges; said surfaces on said coupling flanges being cylindrical, and said coupling ring having radially disposed lugs on its outer and inner peripheries to contact with the respective said surfaces on said coupling flanges at annularly spaced zones, said lugs on the outer periphery of said coupling ring being arranged in alternate relation to the lugs on the inner periphery of said ring and the portions of said peripheries between said lugs being spaced from the respective said cylindrical surfaces.

5. In a flexible coupling for shafts which comprises a coupling flange to be secured coaxially on each of two shafts to be coupled, one flange having an annular surface facing inwardly toward the flange axis and the other flange having a surface facing outwardly from the axis of the flange, a coupling ring which is rigid in radial directions and otherwise flexible and has its outer and inner peripheries in contact respectively with said inwardly facing surface and said outwardly facing surface, and means connecting said coupling flanges to said coupling ring at points spaced annularly of said ring and with the points of connection between said ring and one said flange alternately disposed with respect to the points of connection of said ring with the other flange, whereby said coupling flanges shall be positively held with their centers collinear and said coupling ring may flex to compensate for angular misalinement of the axes of rotation of said flanges; said surfaces on said coupling flanges being cylindrical, and said coupling ring having radially disposed lugs on its outer and inner peripheries to contact with the respective said surfaces on said coupling flanges at annularly spaced zones, said lugs on the outer periphery of said coupling ring being arranged in alternate relation to the lugs on the inner periphery of said ring and the portions of said peripheries between said lugs being spaced from the respective said cylindrical surfaces, each said lug being located in line radially of said coupling ring with one of said points of connection between said ring and said coupling flanges.

6. In a flexible coupling for shafts which comprises a coupling flange to be secured coaxially on each of two shafts to be coupled, one flange having an annular surface facing inwardly toward the flange axis and the other flange having a surface facing outwardly from the axis of the flange, a coupling ring which is rigid in radial directions and otherwise flexible and has its outer and inner peripheries in contact respectively with said inwardly facing surface and said outwardly facing surface, and means connecting said coupling flanges to said coupling ring at points spaced annularly of said ring and with the points of connection between said ring and one said flange alternately disposed with respect to the points of connection of said ring with the other flange, whereby said coupling flanges shall be positively held with their centers collinear and said coupling ring may flex to compensate for angular misalinement of the axes of rotation of said flanges; said inner and outer peripheries of said coupling ring being cylindrical and said surfaces on said coupling flanges having radially disposed lugs to contact with the respective said peripheries of said coupling ring.

7. In a flexible coupling for shafts which comprises a coupling flange to be secured coaxially on each of two shafts to be coupled, one flange having an annular surface facing inwardly toward the flange axis and the other flange having a surface facing outwardly from the axis of the flange, a coupling ring which is rigid in radial directions and otherwise flexible and has its outer and inner peripheries in contact respectively with said inwardly facing surface and said outwardly facing surface, and means connecting said coupling flanges to said coupling ring at points spaced annularly of said ring and with the points of connection between said ring and one said flange alternately disposed with respect to the points of connection of said ring with the other flange, whereby said coupling flanges shall be positively held with their centers collinear and said coupling ring may flex to compensate for angular misalinement of the axes of rotation of said flanges; said inner and outer peripheries of said coupling ring being cylindrical and said surfaces on said coupling flanges having radially disposed lugs to contact with the respective said peripheries of said coupling ring, said lugs on each of said surfaces being arranged in alternate relation to the lugs on the other surface.

8. In a flexible coupling for shafts which comprises a coupling flange to be secured coaxially on each of two shafts to be coupled, one flange having an annular surface facing inwardly toward the flange axis and the other flange having a surface facing outwardly from the axis of the flange, a coupling ring which is rigid in radial directions and otherwise flexible and has its outer and inner peripheries in contact respectively with said inwardly facing surface and said outwardly facing surface, and means connecting said coupling flanges to said coupling ring at points spaced annularly of said ring and with the points of connection between said ring and one said flange alternately disposed with respect to the points of connection of said ring with the other flange, whereby said coupling flanges shall be positively held with their centers collinear and said coupling ring may flex to compensate for angular misalinement of the axes of rotation of said flanges; said inner and outer peripheries of said coupling ring being cylindrical and said surfaces on said coupling flanges having radially disposed lugs to contact with the respective said peripheries of said coupling ring, said lugs on each of said surfaces being arranged in alternate relation to the lugs on the other surface, each said lug being located in line radially of the corresponding coupling flange with one of said points of connection between said coupling flanges and said coupling ring.

EMIL E. HOLLANDER.